June 3, 1969 W. ENGEL 3,448,359
SELF-ADJUSTING COMPENSATOR PREFERABLY FOR MEASURING RECORDERS
Filed March 22, 1967
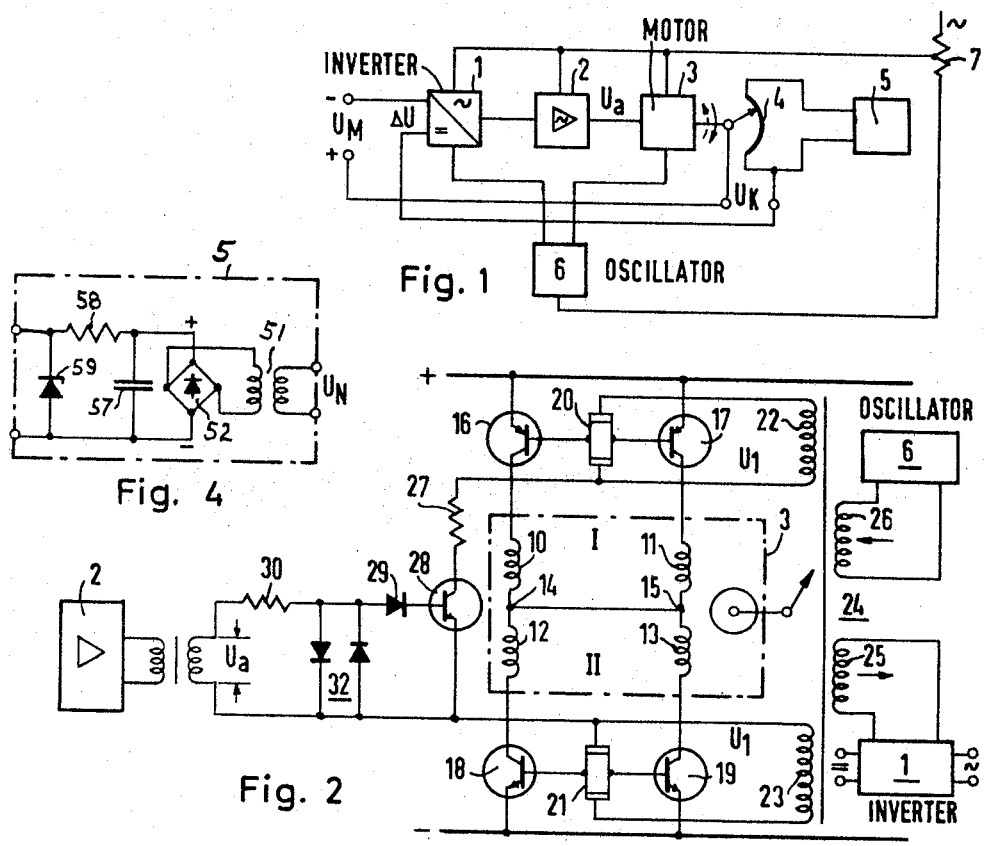

United States Patent Office 3,448,359
Patented June 3, 1969

3,448,359
SELF-ADJUSTING COMPENSATOR PREFERABLY FOR MEASURING RECORDERS
Walter Engel, Nuremberg, Germany, assignor to Siemens Aktiengesellschaft, a corporation of Germany
Filed Mar. 22, 1967, Ser. No. 625,126
Claims priority, application Germany, Mar. 24, 1966, S 102,725
Int. Cl. G05b *11/01*
U.S. Cl. 318—18                 7 Claims

ABSTRACT OF THE DISCLOSURE

A self-adjusting compensator compares a small direct voltage with an adjustable reference voltage and causes the resulting error voltage to control the operation of a reversible direct-current motor which changes the setting of a potentiometer for adjusting the reference voltage to the balance value. The slight error voltage is translated to an alternating voltage by means of an inverter keyed from an oscillator. The motor receives energization from a separate direct-current supply through an electronic commutator system which is controlled by the oscillator frequency applied to the inverter. Hall generators subjected to the magnetic field of the motor provide directional control of the commutator system.

---

My invention relates to a self-adjusting compensator in which a voltage is to be measured is compared with an adjustable reference voltage, and the resulting difference or error voltage is translated by an inverter into an alternating voltage which, upon amplification, is applied to a control motor operating as a demodulator and displacing the tap of a potentiometer to thereby adjust the reference voltage. Such compensators are used, for example, as components of measuring recorders, also called compensographs, which serve to ascertain and record a time curve of a small measuring quantity that cannot be subjected to an appreciable load. As a rule, the above-mentioned control motor of the reference potentiometer also operates to displace the recording stylus of the apparatus.

The control motor in known compensators of the above-mentioned type is a two-phase induction (asynchronous) motor which has one phase energized by the modulation voltage of the inverter while the other phase is energized by the output voltage of the alternating voltage amplifier. Depending upon the phase relation of the two voltages and the amplitude of the amplifier output voltage, the control motor runs in one or the other direction, or at higher or lower speed. Such a control motor has the disadvantage of operating at a relatively slight steepness of control (rate of change) so that the standstill friction, variable with time, puts an appreciable limit upon the accuracy of the compensator performance. Another shortcoming is the fact that the oscillator which provides the modulation frequency for the inverter must also furnish the power required for operating the control motor.

It is an object of my invention to eliminate the above-mentioned disadvantages of such compensating devices.

To this end, and in accordance with a feature of my invention, I employ as control motor in an organization generally of the type described above, a direct-current motor having an electronic commutating device controlled by the output alternating voltage of the alternating-voltage amplifier.

In a compensator system according to the invention, the oscillator furnishing the modulation frequency is no longer required to also provide power for the control motor. The current for operating the motor rather is taken from an auxiliary voltage source. Hence the modulation frequency of the oscillator is not directly dependent upon the construction of the motor but remains freely selectable within wide limits.

Particularly well suitable as a modulator for the purpose of the present invention is a direct-current motor with an electronic commutator as described in the co-pending application of E. Rainer, Ser. No. 504,308, filed Oct. 24, 1965, and assigned to the assignee of the present invention. In such a motor, each phase of the stator winding is subdivided at its midpoint into two component windings, and the midpoints of the phase windings are connected with each other, the collector-emitter path of a switching transistor being connected in series with each of the component windings respectively. The bases of the switching transistors appertaining to each of the respective phases are connected with each other through the Hall electrodes of a Hall generator subjected to the magnetic field of the motor. The control-current electrodes or terminals of the Hall generators are connected with each other through a resistor so that an impressed emitter-base current can flow through all of the switch transistors. When the direction of the control current in the Hall generators changes, the running direction of the motor will also change. Such a motor has a considerably higher efficiency than an induction motor, so that the requirements to be met by the supply of direct current are relatively moderate.

For the purpose of the present invention, the circuitry of a direct-current motor of the type just mentioned is to be modified by employing as control voltage for the Hall genertaors an alternating voltage having the modulation frequency of the inverter, and by intercoupling the control-current paths of the Hall generators by means of a control transistor which is switched on and off in synchronism with the half waves of the amplifier voltage. Depending upon the phase position of these switching pulses relative to the oscillator pulse cycle, the motor is caused to run in the forward or reverse direction at a speed dependent upon the control degree (delayed commutation) of the control transistor. This principle according to the invention is applicable to advantage in conjunction with any follow-up control systems and consequently is not limited to recorders or other measuring apparatus, although the invention was originally conceived and is herein specifically exemplified with reference to compensographs.

For further describing and explaining the invention, reference will be had to the accompanying drawing, in which an embodiment of a self-adjusting compensator is schematically illustrated by way of example.

FIG. 1 is a block diagram of the self-adjusting compensator.

FIG. 2 is a circuit diagram of the same compensator, particularly showing the details of the electronically commutated control motor with the associated circuits;

FIG. 3 is an explanatory graph relating to the operation of the compensator according to FIGS. 1 and 2; and FIG. 4 shows a detail applicable in a comparator otherwise corresponding to FIGS. 1 and 2.

The compensator represented by the block diagram of FIG. 1 serves to compare a small measuring magnitude, manifested by a small direct voltage $U_M$, with a reference voltage $U_K$ of the same magnitude but opposed polarity. When the two voltages $U_M$ and $U_K$ are not exactly balanced against each other, a difference or error voltage $\Delta U$ will occur. The amplifier of the compensator must satisfy the requirement of high zero stability. For that reason the minute error voltage $\Delta U$ is translated by an inverter 1 into an alternating voltage of a given frequency whose amplitude is proportional to the applied direct voltage $\Delta U$. This alternating voltage is amplified in an electronic amplifier 2. The amplified voltage is applied to a demodulator 3 which is constituted by a control motor acting through a control member to displace the tap contact of a balancing potentiometer 4 energized by direct voltage from a constant-voltage source 5. The source 5 may be constituted by a resistance bridge network of which the potentiometer 4 forms part and which is energized by constant direct current. The energizing voltage of the resistance bridge 5 must be kept constant. For this purpose, the feed voltage of the bridge is periodically compared with the voltage of a standard battery or with a Zener voltage and is automatically adjusted in the event of a departure.

Any other suitable source of constant direct voltage is applicable instead of a bridge network. For example, the source 5 in FIG. 1 may be internally organized as shown in FIG. 4. A small transformer 51 connected to utility line voltage $U_N$ supplies current to a rectifier 52 whose output terminals are connected to the above-mentioned potentiometer 4 through a smoothing filter composed of a parallel capacitor 53 and a series resistor 54, a Zener diode 55 being provided for securing constant voltage at the terminals of the potentiometer 4.

Reverting to FIG. 1, it is known to use as demodulator a two-phase induction motor having one phase controlled by the modulation frequency of an oscillator 6 and the other phase from the output voltage $U_a$ of the amplifier 2. Schematically shown at 7 in FIG. 1 is a device for supplying current to the circuit components 1 to 6.

According to the invention, the modulator-motor 3 in a comparator system of the type schematically shown in FIG. 1 is constituted by a direct-current motor operating without a mechanical commutator. Such a motor is illustrated in FIG. 2. Each of the two phases I and II of the stator winding, these phases being 90° displaced from each other, is divided at its midpoint into two component windings 10, 11, 12, 13, and the midpoints 14 and 15 are connected with each other. Associated with the four component windings 10 to 13 are respective switching transistors 16 to 19. The transistors 16 and 17 are of the pnp type, the transistors 18 and 19 are of the npn type. The bases of the two switching transistors 16 and 17, or 18 and 19 appertaining to the same phase are connected with each other through the Hall electrodes of a Hall generator 20 or 21. The control electrodes (current terminals) of the Hall generators are connected with respective secondary windings 22 and 23 of a transformer 24 whose primary winding 26 is energized from the oscillator 6 or forms part thereof. Another secondary winding 25 of transformer 24 provides modulation voltage for the inverter 1. It will be recognized that the control electrodes or current terminals of the Hall generators 20 and 21 are controlled in synchronism with the modulation-frequency cycle of the inverter 1.

One of the control electrodes of Hall generator 20 is connected with one of the control electrodes of Hall generator 21 through a resistor 27 and through the collector-emitter path of a control transistor 28. Connected in parallel relation to the base-emitter path of the control transistor are a diode 29, a resistor 30 and the output winding 31 of the alternating-current amplifier 2. Two diodes 32 in antiparallel connection limit the output voltage of the amplifier 2.

The two Hall generators 20 and 21 are mounted in the magnetic field of the direct-current motor 3, preferably in the air gap between rotor and stator, and are 90° el. displaced from each other. The rotor conventionally comprises a permanent magnet to provide excitation for the motor. The Hall generators, therefore, are traversed by the magnetic flux of the permanent-magnet rotor with the effect that the respective voltages at the two pairs of Hall electrodes are likewise 90° electrically displaced from each other. However, the Hall generators may also be mounted at some other location, for example on a bearing shield, in which case a permanent-magnet control head connected with the motor shaft may rotate together with the rotor. The poling of the output voltage provided by the Hall electrodes of the Hall generators 20 and 21 is such that the transistors of each individual Hall-generators system are alternately turned on in accordance with the desired runnnig direction of the motor. The individual turn-on intervals of each transistor pair extend over a full half wave of the induced counter voltage. The transistor control is such that at any time the one component winding can conduct current whose induced voltage is opposed to the applied operating voltage.

The operation of the circuitry shown in FIG. 2 will now be described in conjunction with FIG. 1:

Assume that the control resistor 28 is turned on. A base current then flows from the positive bus through the emitters of respective transistors 16 and 17 to the two Hall electrodes of the Hall generator 20 and thence through the lower control electrode of Hall generator 20 to the resistor 27 and the collector-emitter path of the control transistor 28, thence to the control electrode of the Hall generator 21 where the current becomes divided through the bases of the respective switching transistors 18 and 19 before it reaches the negative bus. This base current through resistor 27 provides for a preliminary (impressed) current flow in the transistor 16 to 19 which facilities overcoming the threshold voltage. The switching transistors will turn on whenever the Hall current driven by the output (Hall-electrode) voltage of Hall generator 20 or 21 becomes added in the cumulative sense to the preliminarily impressed current.

As mentioned, the two Hall generators 20 and 21 are 90° displaced so that the control fields of the respective Hall generators and consequently the output voltages at the Hall electrodes are displaced 90° el. relative to each other. These Hall-generator output voltages are so poled that the two transistors connected with the respective two Hall electrodes of each Hall generator 20 or 21 are turned on, in accordance with the desired running direction of the motor, during a full half-wave period of the induced counter voltage. That is, the transistors 16 and 17 are turned on during one half wave, and the transistors 18 and 19 during the next half wave, and so forth. The control therefore is such that only the component motor winding can conduct current whose induced voltage is opposed to the applied operating voltage U.

Normally the error voltage $\Delta U$ is zero, and the output voltage $U_a$ of the amplifier 2 is also zero. Under these normal conditions the control transistor 28 is turned off. Consequently, no preliminary current is impressed upon the transistors 16 to 19. The Hall voltage of the Hall generators 20 and 21 is not alone sufficient to switch the transistors 16 to 19 to the ON condition. Hence, the component windings 10 to 13 are not supplied with current, and the motor 3 remains at standstill.

Since the control voltage of the Hall generators 20 and 21 is not a direct voltage but is alternating at the pulse frequency of the oscillator 6, the Hall generators 20, 21 and therefore the windings 10 to 13 can receive voltage only in accordance with the oscillator cycle frequency. The corresponding voltage pulses are represented by the graph of FIG. 3 in which the horizontal axis denotes time ($t$). The top diagram in FIG. 3 exemplifies the voltage pulses $U_1$ passing alternately through the switching transistors 16, 17 and 18, 19. Since the inverter 1 is correspondingly pulsed in synchronism with the oscillator, the output voltage $U_a$ and the control voltage $U_1$ of the Hall generators are in phase with each other when the error voltage $\Delta U$ departs from the reference voltage in the positive sense. In the event of a negative departure of the error voltage $\Delta U$, a phase jump occurs between the output voltage $U_a$ and the oscillator frequency so that now the negative half wave of the keying frequency is controlled. The middle diagram in FIG. 3 represents the modulation in dependence upon the positive half waves of the output voltage $U_a$. This diagram corresponds to the rhythm in which one of the pairs of component windings 10 and 12, 10 and 13, 11 and 12, or 11 and 13 receives voltage and thus causes the rotor to rotate in accordance with the voltage pulses. The lowermost diagram in FIG. 3 exemplifies a corresponding speed-time diagram of the motor, the vertical axis in this case representing units of rotational speed $n$.

To those skilled in the art it will be obvious upon a study of this disclosure that my invention permits of various modifications and may be given embodiments other than illustrated and described herein, without departing from the essential features of my invention and within the scope of the claims annexed hereto.

I claim:

1. A self-adjusting compensator comprising direct voltage reference means, circuit means connected to said reference means for comparing a voltage to be measured with the reference voltage and providing an error voltage dependent as to polarity and amplitude upon the departure of the measured voltage from the reference voltage, an inverter connected to said circuit means for converting said error voltage to an alternating voltage of a given frequency, a reversible motor electrically connected to said inverter to operate as a demodulator and mechanically connected to said reference means to adjust the reference voltage for eliminating said error voltage, said motor being a direct-current motor with an electronic commutator having commutating electronic switching devices, and control circuit means through which said switching devices are connected to said inverter so that said commutator system is controlled by the alternating output voltage of said inverter.

2. A compensator according to claim 1, comprising an oscillator for providing a control voltage having said given frequency, and means coupling said oscillator with said inverter and with said control circuit means of said commutator.

3. In a compensator according to claim 1, said motor having a permanently magnetized rotor and having commutatable stator windings, direct-current supply means connected to said stator windings for energizing said windings, said electronic switching devices being serially connected with said respective windings to control the flow of current from said supply means to said respective windings.

4. In a compensator according to claim 3, said motor having a two-phase stator circuit with each phase mid-divided into two of said windings, the two midpoints of said phases being connected with each other, said electronic switching devices being switching transistors of which each has a collector-emitter path serially connected with one of said respective windings, two Hall generators controlled in dependence upon the rotary position of said rotor and electrically phase displaced from each other, each Hall generator having two control-current terminals and two Hall electrodes, a control transistor and a resistor, the two switching transistors for each of said respective two phases having respective bases connected through one of said Hall electrodes and one of said terminals of one of said respective Hall generators to a series connection formed of said resistor and the emitter-collector path of said control transistor, whereby an impressed current can flow through all of said switching transistors when said control transistor is turned on, said control transistor having a base connected to said inverter to be turned on and off in dependence upon the modulating frequency of said inverter.

5. A compensator according to claim 4, comprising an alternating current amplifier connected between said inverter and said base of said control transistor for controlling said latter transistor by the alternating output voltage of said amplifier.

6. A compensator according to claim 5, comprising a diode connected in series between said amplifier and said base of said control transistor to permit only a given half wave of said amplifier output voltage to be applied to said base.

7. A compensator according to claim 6, comprising mutually antiparallel diodes connected in parallel relation to the base-emitter path of said control resistor for limiting the amplitude of the amplified voltage applied to said latter path.

References Cited

UNITED STATES PATENTS

| | | | |
|---|---|---|---|
| 3,122,689 | 2/1964 | Atkinson | 318—29 |
| 3,159,777 | 12/1964 | Manteuffel | 318—254 XR |
| 3,345,558 | 10/1967 | Christian | 318—29 XR |
| 3,375,422 | 3/1968 | Boudigues | 318—138 |
| 3,397,351 | 8/1968 | Wolfendale | 318—254 XR |

BENJAMIN DOBECK, *Primary Examiner.*

U.S. Cl. X.R.

318—138, 254